Jan. 18, 1927.
M. M. MITCHELL
BELT FASTENER
Filed Oct. 13, 1924
1,614,751
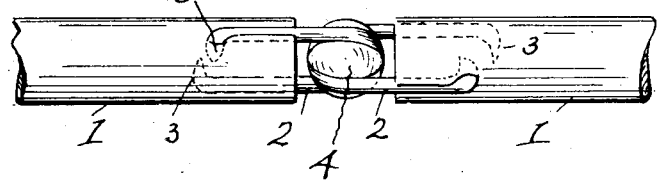
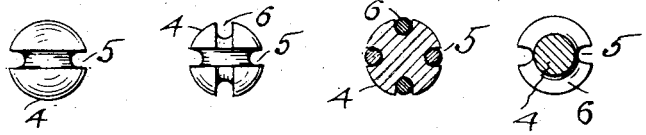
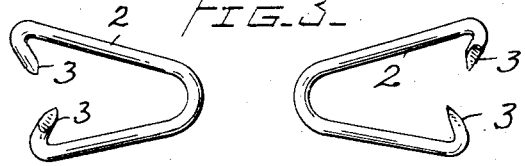
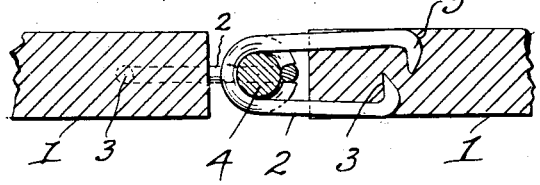
Inventor
Mark M. Mitchell
Thurston Kwis & Hudson
attys Patented Jan. 18, 1927.

1,614,751

UNITED STATES PATENT OFFICE.

MARK M. MITCHELL, OF CLEVELAND, OHIO, ASSIGNOR TO EDWARD J. MITCHELL, OF CLEVELAND, OHIO.

BELT FASTENER.

Application filed October 13, 1924. Serial No. 743,232.

This invention relates to belt fasteners designed for securing together the free ends of driving belts, more particularly round belts of leather or other suitable material.

The principal objects of the invention are to provide a fastener which can be economically manufactured, which can be quickly and easily detached from one end of the belt to permit removal of a portion of the belt to take up slack, which does not weaken the end portions of the belt to which it is fastened, which does not allow twisting movement of one end of the belt with respect to the adjacent end to which it is connected, which flexes freely in any direction and which does not have any projecting metal parts to knock against the pulleys over which the belt passes.

With the above and other objects in view, the invention may be said to comprise the device as illustrated in the accompanying drawings hereinafter described and particularly set forth in the appended claims, together with such variations and modifications thereof as will be apparent to one skilled in the art to which the invention appertains.

Reference should be had to the accompanying drawings forming a part of this specification in which Fig. 1 is a side elevation showing the fastener applied to a belt; Fig. 2 is a longitudinal central section through the adjacent ends of the belt and the fastener connecting them; Fig. 3 is a view showing the fastener members detached in side elevation; Figs. 4 and 5 are plan views of the ball which is interposed between the interlinked connecting members; Figs. 6 and 7 are diametrical sections through the ball.

Referring to the accompanying drawings, the belt to which the fastener is applied is designated by the reference numeral 1 and the fastener consists of two identical U-shaped members 2, the free ends of which are bent inwardly to form attaching prongs 3 adapted to be imbedded in the belt, one of the arms of each of the connecting members being longer than the other so that the oppositely disposed prongs are offset one with respect to the other. The two U-shaped connecting members 2 are interlinked with each other between the adjacent ends of the belt 1 and interposed between the interlinked connecting members there is a ball 4 which is provided with a circumferential groove 5 to receive one of the connecting members and a second circumferential groove 6 in a diametrical plane at right angles to the plane of the groove 5 to receive the other of the connecting members.

In applying the fastener to the belt, the ball 4 will be inserted into the forward portion of one of the connecting members with one of its grooves receiving the closed end portion of said member. The other fastening member will be inserted through the first and disposed with its closed end in the other groove of the ball. The fastening members are then applied to the ends of the belt by forcing said ends between the inwardly bent prongs of the fastener and pressing the arms of the member together with a pair of pincers or other suitable tool to force the prongs into the belt as shown in Figs. 1 and 2, this operation at the same time causing the interlinked closed ends of the fastening members to be bent into close engagement with the ball. The grooved ball engaging the two fastening members at substantially the longitudinal axis of the belt lock the two members against relative turning movement about their longitudinal axis and holds them at all times in planes at right angles to each other, at the same time permitting one of the fastening members to swing angularly in any direction with respect to the other. The interlocking of the fastening members by means of the grooved ball 4 serves to prevent twisting movement of one end of the belt with respect to the other and also to prevent any relative movement between the ends of the belt except angular movement about the center of the ball. Round belts have a tendency to turn laterally during their movement and the fastener herein disclosed provides equal flexibility at any position which the belt may assume while on the pulleys. To take up the slack in the belt it is only necessary to spread the arms of one of the fastening members to release one end of the belt, cut off the necessary length and reattach the fastener by pressing the prongs into the belt.

Having described my invention, I claim—

1. A belt fastener comprising a pair of connecting members adapted to be interlinked one with the other and each adapted to be secured to a free end of a belt, and means interposed between said members adapted to hold the same against relative turning movement about their longitudinal axis but permitting relative angular movement in other directions, said connecting members and holding means lying substantially within the confines of the joined belt ends.

2. A belt fastener comprising a pair of connecting members adapted to be rigidly secured to adjacent free ends of the belt and to be interlinked between the ends of the belt, and means interposed between said members for taking up the play between the interlinked members but permitting relative angular movement between them, said connecting members lying substantially within the confines of the joined belt ends.

3. A belt fastener comprising a pair of connecting members adapted to be rigidly secured to adjacent free ends of a belt and to be interlinked between the ends of the belt, and a ball interposed between said connecting members, said connecting members and ball lying substantially within the confines of the joined belt ends.

4. A belt fastener comprising a pair of U-shaped wire connecting members, the free ends of each of said members being attachable to the free end of a belt and said members adapted to be interlinked between the ends of the belt, and a ball interposed between said interlinked members, said connecting members and ball lying substantially within the confines of the joined belt ends.

5. A belt fastener comprising a pair of U-shaped wire connecting members adapted to be rigidly secured to adjacent free ends of a belt and to be interlinked between the ends of the belt, and a ball interposed between said interlinked members, said ball having a circumferential groove to receive each of said members.

6. A belt fastener comprising a pair of U-shaped wire connecting members adapted to be rigidly secured to adjacent free ends of a belt and to be interlinked between the ends of the belt, a ball interposed between the interlinked members, said ball having two circumferential grooves in diametrical planes at right angles to each other to receive the respective connecting members.

7. A belt fastener comprising a pair of U-shaped connecting members adapted to be rigidly secured to adjacent free ends of a belt and to be interlinked between the ends of the belt, each of said U-shaped members having inwardly bent prongs at the free ends thereof adapted to be imbedded in the belt, and means interposed between said members for maintaining the same in planes at right angles to each other and for permitting angular movement of one with respect to the other.

8. A belt fastener comprising a pair of U-shaped wire connecting members, the free ends of which are bent inwardly to form attaching prongs adapted to be embedded in a belt, said members being interlinked, and a ball interposed between the interlinked members, said ball having circumferential grooves in diametrical planes at right angles to each other to receive the respective members.

In testimony whereof, I hereunto affix my signature.

MARK M. MITCHELL.